United States Patent
Zangrando et al.

(10) Patent No.: US 7,379,482 B2
(45) Date of Patent: May 27, 2008

(54) PROGRAMMABLE ELEMENT OF SYNCHRONOUS NETWORK AND METHOD FOR MANAGING IT

(75) Inventors: Giovanni Zangrando, Milan (IT); Pietro Grandi, Milan (IT); Livia Schweizer, Milan (IT)

(73) Assignee: ALCATEL, Paris (FR)

( * ) Notice: Subject to any disclaimer, the term of this patent is extended or adjusted under 35 U.S.C. 154(b) by 1052 days.

(21) Appl. No.: 10/206,961

(22) Filed: Jul. 30, 2002

(65) Prior Publication Data

US 2003/0027564 A1 Feb. 6, 2003

(30) Foreign Application Priority Data

Jul. 31, 2001 (IT) .......................... MI2001A1656

(51) Int. Cl.
*H04J 3/02* (2006.01)

(52) U.S. Cl. ...................... 370/537; 370/470; 370/419; 398/43

(58) Field of Classification Search ..................... None
See application file for complete search history.

(56) References Cited

U.S. PATENT DOCUMENTS

| 5,315,594 | A | * | 5/1994 | Noser | 370/353 |
| 6,038,211 | A | * | 3/2000 | Lemaire | 370/216 |
| 6,487,223 | B1 | * | 11/2002 | Tanonaka | 370/539 |
| 6,496,519 | B1 | * | 12/2002 | Russell et al. | 370/465 |
| 6,917,630 | B1 | * | 7/2005 | Russell et al. | 370/532 |
| 2002/0001308 | A1 | * | 1/2002 | Heuer | 370/386 |

* cited by examiner

*Primary Examiner*—Bob A. Phunkulh
(74) *Attorney, Agent, or Firm*—Sughrue Mion, PLLC

(57) ABSTRACT

Described is a SDH or SONET telecommunication network element provided with a plurality of interfaces for managing first SDH or SONET flows, comprising: a) a plurality of first layer ports for managing second SDH or SONET flows, wherein the ports are individually programmable as concerns the hierarchical structure of the managed flows, and b) a switching system coupled to the interfaces and to the ports, in order to implement the switching of virtual containers between the SDH or SONET flows, wherein the switching system is programmable as far as the switching to be implemented is concerned.

16 Claims, 1 Drawing Sheet

PROGRAMMABLE ELEMENT OF SYNCHRONOUS NETWORK AND METHOD FOR MANAGING IT

This application is based on, and claims the benefit of, Italian Patent Application No. MI2001A001656 filed on Jul. 31, 2001, which is incorporated by reference herein.

BACKGROUND OF THE INVENTION

1. Field of the Invention

The present invention relates to a SDH or SONET telecommunication network element and to a method for managing such an element.

2. Description of the Prior Art

Every telecommunication network can be seen as a set of network elements (electronic and/or optical apparatus) intercommunicating through electrical, optical or radio connections.

The telecommunication network providers are willing to purchase and install flexible apparatus to match easier and more economically the networks to the users' service requirements.

Furthermore, the providers prefer apparatus which can be completely and easily managed by network management systems.

Generally, a telecommunications apparatus is of modular type and comprises several boards; each board has its own function; the purchaser of the apparatus decides also its "configuration", namely which and how many boards are to be inserted. For example, if the apparatus should be initially able to manage 256 SDH flows at 155 Mbit/sec, it comprises a proper number of boards to comply with such requirements. If, after some years, the requirements are changed and it is necessary for example to manage 16 SDH flows at 155 Mbit/sec and 256 SDH flows at 622 Mbit/sec, some of these boards are removed and discarded (as they are no more useful) and new boards are inserted for the new requirements. Of course, such a situation is not appreciated by the providers.

Similar problems occur even if there is the need to re-configure the network without increasing the traffic management capacity of apparatus.

SUMMARY OF THE INVENTION

The object of the present invention is to solve such problems for the telecommunication networks of SDH or SONET type.

A solution for such a problem is provided by the network element having the characteristics mentioned in the claim 1.

The basic idea of the present invention is the use of programmable-type termination ports for the communication protocols.

According to a further aspect, the present invention also concerns a method for managing such a network element, having the functionalities mentioned in claim 9.

Other advantageous features of the present invention are mentioned in the dependent claims. All the claims are intended to be an integral part of the present description.

The present invention will certainly become clear in view of the following detailed description, given by way of a mere non limiting and exemplifying example, to be read with reference to the attached FIGURE, wherein a very simplified diagram block of a network element is illustrated according to the present invention.

BEST MODE FOR CARRYING OUT THE INVENTION

Figure 1:
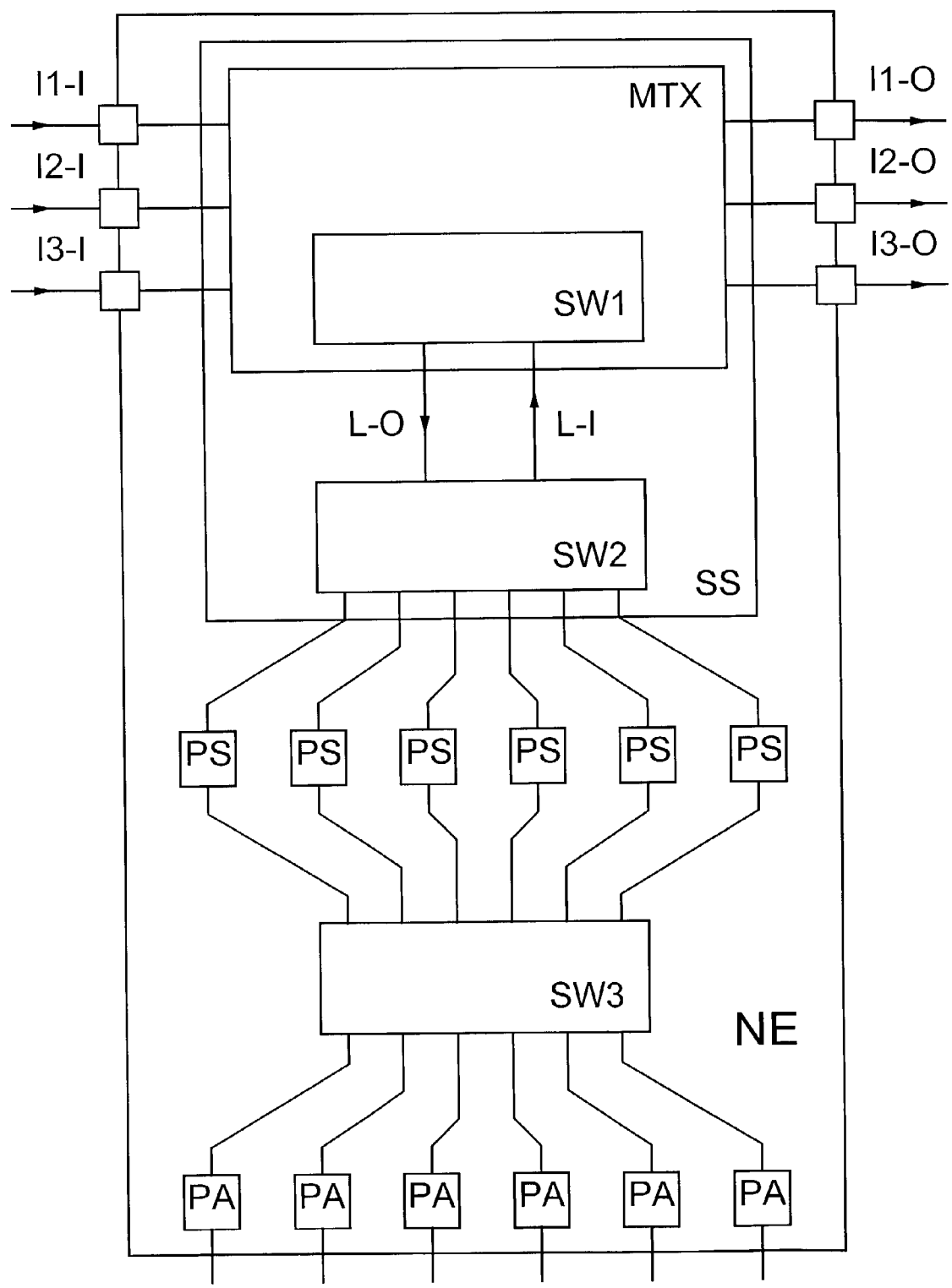
FIG. 1 is an exemplary embodiment of the invention.

With reference to the sole FIGURE, a network element NE, according to the present invention, is fit for being employed in the telecommunications network of SDH type; the know-how of the present invention is fully applicable also to network elements and to networks of SONET type: In fact, as it is well known, both the communication systems are extremely similar; hereunder, we refer to SDH and SONET networks as totally analogue and alternative by using the SDH/SONET symbol.

The network element NE is provided with a plurality of interfaces I1,I2,I3 for the management of SDH/SONET (STM-1, STM-4, STM-16, STS-1, STS-3, . . . ) data flows, which shall be referred hereunder as the "first data flows"; in the FIGURE, input interfaces I1-I, I2-I, I3-I and output interfaces I1-O, I2-O, I3-O have been illustrated as connected to separate connections; in the SDH/SONET (but also ATM and IP) world, a reference is always made to bi-directional connections even if, in the almost totality of cases, these are implemented through two physical unidirectional connections.

The network element NE comprises:

a) a plurality of first layer ports PS for the management of the SDH/SONET data flows (VC12, VC11, VC4, VC3, VT1.5, VT6 . . . ), which will be referred hereunder as "second flows", and b) a switching system SS coupled to the interfaces I1,I2,I3 and to the ports of first layer PS, and fit for implementing the switching of virtual containers between the SDH/SONET flows (in the most general case, both the first and the second flows);

the ports of first layer PS are individually programmable as far as the hierarchical order of the flow that is managed is concerned (VC12, VC11, VC4, VC3, VT1.5, VT6 . . . ); the switching system SS is programmable as far as the switching to be implemented is concerned.

The term "first layer ports", it is intended as the termination ports of communication protocols belonging to the first ISO/OSI layer: in the case of the present invention, SDH or SONET ports.

Such a network element shows a wide flexibility under the application point of view vis-à-vis the usual network elements.

According to a first embodiment which is particularly preferred by the present invention, the switching system SS comprises a switching matrix MTX for SDH/SONET signals and a first inner connection L-O which couples the MTX matrix to the first layer ports PS; in addition, the matrix MTX comprises the first switching means SW1 fit for receiving the virtual containers for the second flows, in order to generate a first inner signal having a frame structure which is analogue to the SDH/SONET frame structure (for example, STM-1 or STM-4) and consisting in the multiplexing of the virtual containers received, and in transmitting the first signal on the first connection L-O; and furthermore, the matrix MTX is programmable at least as far as the virtual containers to be inserted into the second data flows are concerned.

In this way, the ports PS can be placed on a separate board of the apparatus which is in communication with the board which generally carries the matrix MTX through a simple connection L-O, for example of serial type.

In case of need of a certain number of ports PS which can not be placed on a single board, it is possible to provide a plurality of boards for the ports PS and a corresponding plurality of connections L-O.

In such a first embodiment, for a better exploitation of the transport capacity of the connection L-O, it is advantageous to provide for the first SW1 switching means to be programmable according to the position of the virtual containers received inside of the frame of the first signal.

In such a first embodiment, for a higher flexibility of the network element NE. it is advantageous to provide, in the switching system SS, second switching means SW2 coupled to the first switching means SW1 through the first connection L-O and to the ports PS of first layer, and fit for receiving the first signal, and to extract the virtual containers herein contained, and to transmit them to the PS ports of the first layer, and to provide for such second switching means to be programmable as concerns the association between the virtual containers extracted and the ports of first layer.

According to a second embodiment particularly preferred by the present invention, the switching system SS comprises a switching matrix MTX of SDH/SONET signals and a second inner connection L-I which couples the ports PS of first layer to the matrix MTX; furthermore, the matrix MTX comprises the first switching means SW1able to receive a second inner signal from the ports PS of first layer through a second connection L-I, the second inner signal having a structure which is similar to the SDH/SONET frame (for instance, STM-1 or STM-4) and being formed by the multiplexing of virtual containers of the second flows, and to extract the virtual containers herein contained, and to transmit them for a further switching within the matrix MTX; and in addition, the matrix MTX is programmable at least as far as the further switching to be implemented for the virtual containers of the second flows is concerned.

In this way, the ports PS can be placed onto a separate board of the apparatus in communication with the board which generally carries the matrix MTX through a simple connection L-I, for instance, of serial type.

In case of need of a certain number of ports PS which can not be placed on a single board, it is possible to provide a plurality of boards for the ports PS and a corresponding plurality of connections L-I.

In such a second embodiment, for a higher flexibility of the network element NE, it is advantageous to provide a first SW1 switching means that is programmable as far as the association between the virtual containers extracted and the virtual containers of the second flows is concerned.

In such a second embodiment, for a better exploitation of the transport capacity of the connection L-I, it is advantageous to provide, in the switching system SS, second switching means SW2 coupled to the first SW1 switching means through the second connection L-I and to the ports PS of first layer, and able to receive virtual containers from the ports PS of first layer, and to generate the second signal for the multiplexing of the virtual containers received, and to transmit the second signal to the first switching means SW1, and to provide that the second switching means SW2 be programmable as far as the position of the virtual containers received inside of the frame of the second signal is concerned.

The connections L-O and L-I, within the network element NE, are of an unidirectional type; so far these have been managed in an independent way; in the SDH/SONET (but also ATM and IP) world, on the contrary, the connections are almost always of bi-directional type and therefore the connections L-O and L-I could be handled as a single bi-directional connection. In this case, the characteristics of the first preferred embodiment and of the second preferred embodiment can be combined.

The network element NE according to the present invention can further comprise:

c) a plurality of ports PA of second layer, and d) connection means SW3 coupled at one side to the ports PS of first layer and at the other side to the ports PA of second layer, and fit for connecting the ports PS of first layer to the ports PA of second layer.

The ports of second layer are the termination ports of communication protocols belonging to the second ISO/OSI layer: in the case of the present invention, ATM or IP ports; it is also possible to provide ports configurable under ATM or IP modes.

The presence of ports PA makes the network element NE more flexible; typically, there shall be a port PA for each port PS.

A further flexibility is obtained if the network element NE is made in such a way that it is able to remove/add the PDH encapsulation on the second flows; this task can be advantageously carried out by the ports PS or by the ports PA; the ports can be therefore programmed to implement such a further function in addition to the standard function of the port itself.

It has been explained how many of the functions implemented by the network element have programmable characters in order to provide more flexibility in the network element according to the present invention; in order to facilitate the management of the network element according to the present invention, it is advantageous to arrange in such a way that such programming can be implemented by a network management system.

According to another aspect, the present invention relates to a method for the management of such a network element.

The management method of a network element according to the present invention basically comprises the step of programming the hierarchical structure of the flow that is managed by the ports PS of first layer and the step of programming the switching implemented by the switching system SS.

The method can further comprises the step of programming, within the matrix MTX, the switching to be implemented for the virtual containers of the second flows, both as concerns the virtual containers at the input of the matrix MTX and the virtual containers at the output of the matrix MTX.

In case there is the connection L-O, the method can comprises the step of programming, in the first switching means SW1, the position of the virtual containers inside the first signal.

Advantageously, the method can comprise the step of programming, in the second switching means SW2, the association between the virtual containers extracted by the first signal and the ports PS of first layer.

In case there is a connection L-I, the method can comprise the step of programming, in the second switching means SW2, the position of the virtual containers within the frame of the second signal.

Advantageously, the method can comprise the step of programming, in the first switching means SW1, the association between the virtual containers extracted from the second signal and the virtual containers of the second flows.

Furthermore, the method according to the present invention can comprise the steps of programming the PDH encapsulation/de-encapsulation step and the protocol that is managed by the (SDH or SONET) ports PS and by the (ATM or IP) ports PA.

As already mentioned, it is common that the method according to the present invention be implemented, wholly or partially, by a computer program, which shall therefore comprise code portions fit for implementing the steps of the method when they are implemented by a computer. This computer program is to be considered within the scope of the present invention.

The whole computer program, or one or more of such code portions, can be loaded onto a computer memory means (for example, a CD-ROM, a floppy-disk, a storage device EPROM, and so on); also such a storage device is to be considered within the scope of the present invention.

Hereunder, also the most important software aspects of the method according to the present invention will be considered.

The method for managing the network element, when it is implemented through a computer program, can comprise the step of generating a software request for a port of first layer equipped with the port attributes and of associating the software request for a port of first layer to one of the (physical) ports PS of first layer, and of transmitting the information regarding the port attributes to the associated port of first layer.

Similarly, it can be provided the step of generating a software request for a port of second layer equipped with port attributes, and of associating the software request for a port of second layer to one of the (physical) ports PA of second layer, and of transmitting the information regarding the port attributes to the associated port of second layer.

In this way, the provider can see only the physical ports that are really utilized in the network with their operating functionalities, and the ports not utilized in the network with their operating functionalities; therefore, the ports not utilized in the network and the functionalities not exploited by the network will be hidden.

The positions of the virtual containers within the frame of the first and/or second signal, which travel the inner connections L-O and L-I, respectively, can advantageously be established automatically by the computer program according to a pre-determined algorithm; in this manner, the provider has not to perform this task, which is substantially insignificant for the network management.

But the provider has to re-configure the network from time to time; therefore, the program allocates and de-allocates the time-slot of such frames from time to time; after a certain time, it can occur that the frames result fragmented and therefore the program can not allocate time-slots to high capacity information flows, even if free time-slots are available.

It is therefore advantageous to provide for the positions of the virtual containers inside of the frame can be modified by an operator by interacting with the program for the management processor.

This displacement causes, on the contrary, the deactivation of the "paths" associated to the displaced information flows.

Of course, this is not convenient for the network provider, as the reactivation of paths requires a long period of time.

To overcome this problem, the present invention foresees that the software requests of port assume the name of the port to which they are associated, and that the associations among positions inside of the frames and virtual channels of the second flows be specified by the computer program as attributes. The movement of flows associated to a port causes only a modification of the value of an attribute and not the modification of a management entity which should require the termination of the same and the creation of a new one with new characteristics.

Then, we point out how the network element according to the present invention, thanks to its functionalities and programmability, is fit for being a connection between the SDH/SONET network and a ATM/IP network.

Even if, so far, we have mentioned the SDH and SONET networks, it is clear that the present invention can be applied also in synchronous type networks which shall constitute evolutions or future variants of the SDH and SONET networks.

What is claimed is:

1. A SDH/SONET telecommunication network element provided with a plurality of interfaces for managing first SDH/SONET flows, wherein the network element comprises:
   a) a plurality of first layer ports for managing second SDH/SONET flows, said first layer ports are individually programmable with respect to a hierarchical structure of the managed flows, and
   b) a switching system, coupled to the plurality of interfaces and to the first layer ports, which implements switching of virtual containers between the SDH/SONET flows, wherein said switching system is programmable with respect to implemented switching;
   wherein said switching system comprises:
      a matrix which switches SDH/SONET signals; and
      a first inner connection which couples the matrix to the first layer ports,
         wherein the matrix comprises first switching means which receives virtual containers for said second SDH/SONET flows, to generate a first inner signal comprising a frame structure which is analogue to a structure of a SDH/SONET frame, multiplexes said received virtual containers, and transmits said first inner signal onto said first inner connection, and
         wherein said matrix is programmable, with respect to the virtual containers, for insertion into said second SDH/SONET flows.

2. A network element according to the claim 1, wherein said first switching means is programmable with respect to a position of said virtual containers received inside of a frame of said first inner signal.

3. A network element according to claim 2, wherein the network elements further comprises second switching means coupled to said first switching means through said first inner connection and to said first layer ports, and which receives said first inner signal, to extract virtual containers contained in the first inner signal, and to transmit the virtual containers to said first layer ports, wherein said second switching means is programmable with respect to associations between the extracted virtual containers and the first layer ports.

4. A network element according to claim 1, wherein said switching system comprises:
   a matrix which switches SDH/SONET signals; and
   a second inner connection which couples the first layer ports to the matrix,
      wherein the matrix comprises the first switching means which receives a second inner signal from said first layer ports through said second inner connection, the second inner signal comprising a frame structure which is analogue to a frame structure of a SDH/SONET and multiplexes the virtual containers of said second SDH/

SONET flows, to extract the virtual containers contained in the second SDH/SONET flows, and to transmit the virtual containers for a further switching inside of said matrix, and wherein said matrix is programmable with respect to further switching to be implemented for said virtual containers of said second SDH/SONET flows.

5. A network element according to claim 4, wherein said first switching means is programmable with respect to an association between the extracted virtual containers and the virtual containers of said second SDH/SONET flows.

6. A network element according to claim 5, further comprising a second switching means coupled to said first switching means through said second inner connection and to said first layer ports, and which receives virtual containers from said first layer ports, to generate said second inner signal which multiplexes said received virtual containers, and to transmit said second signal to said first switching means, wherein said second switching means is programmable with respect to a position of said virtual containers received inside of a frame of said second inner signal.

7. A network element according to claim 1, further comprising:
 c) a plurality of second layer ports, and
 d) a connection means coupled on a first side to the first layer ports and on a second side to the second layer ports, and which connects the first layer ports to the second layer ports.

8. The network element according to claim 1, wherein said first layer ports are programmed to remove and add PDH encapsulation on the second SDH/SONET flows.

9. The network element according to claim 1, wherein a programming of the programmable switching system is implemented by a network management system.

10. A method of managing a SDH/SONET telecommunication network element provided with a plurality of interfaces for managing first SDH/SONET flows, wherein the network element comprises a plurality of first layer ports which manage second SDH/SONET flows, and a switching system, coupled to the plurality of interfaces and to the first layer ports, which implements the switching of virtual containers between the SDH/SONET flows, the method comprising:

programming a hierarchical structure of the flows managed by said first layer ports and programming the switching implemented by the switching system, and wherein said switching system comprises:
 a matrix which switches SDH/SONET signals; and
 a first inner connection which couples the matrix to the first layer ports,
  wherein the matrix comprises first switching means which receives virtual containers for said second SDH/SONET flows, to generate a first inner signal comprising a frame structure which is analogue to a structure of a SDH/SONET frame, multiplexes said received virtual containers, and transmits said first inner signal onto said first inner connection, and wherein said matrix is programmable, with respect to the virtual containers, for insertion into said second SDH/SONET flows.

11. A method according to claim 10, further comprising programming, in the matrix which switches SDH/SONET signals, a switching to be realized for the virtual containers of the second SDH/SONET flows.

12. A method according to claim 11, further comprising programming, in the first switching means, a position of the virtual containers inside of the frame of the first signal.

13. A method according to claim 12, further comprising programming, in a second switching means, an association between extracted virtual containers and the first layer ports.

14. A method according to claim 11, further comprising programming, in a second switching means, a position of the virtual containers inside of a frame of a second signal.

15. A method according to claim 14, further comprising programming, in the first switching means, an association between extracted virtual containers and virtual containers of the second SDH/SONET flows.

16. The method according to claim 10, wherein said programming comprises a computer program comprising code.

* * * * *